(12) United States Patent
Beardwood

(10) Patent No.: US 7,261,821 B2
(45) Date of Patent: Aug. 28, 2007

(54) PROCESS FOR TREATING AN AQUEOUS SYSTEM WITH CHLORINE DIOXIDE

(75) Inventor: Edward S. Beardwood, New Market (CA)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 11/269,156

(22) Filed: Nov. 8, 2005

(65) Prior Publication Data
US 2006/0096930 A1    May 11, 2006

Related U.S. Application Data

(60) Provisional application No. 60/626,234, filed on Nov. 8, 2004.

(51) Int. Cl.
*C02F 1/76* (2006.01)
(52) U.S. Cl. ............ 210/743; 210/745; 210/754; 210/764; 422/3; 422/37; 423/477
(58) Field of Classification Search ............ 210/743
See application file for complete search history.

(56) References Cited

U.S. PATENT DOCUMENTS

| | | | | |
|---|---|---|---|---|
| 4,013,761 A | * | 3/1977 | Ward et al. ............. | 423/477 |
| 4,247,531 A | * | 1/1981 | Hicks ..................... | 423/477 |
| 4,250,144 A | * | 2/1981 | Ratigan .................. | 422/112 |
| 4,251,224 A | * | 2/1981 | Cowley et al. ......... | 423/477 |
| 5,382,520 A | | 1/1995 | Jenson et al. ............ | 436/55 |
| 5,476,579 A | * | 12/1995 | Choi et al. .............. | 205/335 |
| 5,618,440 A | * | 4/1997 | Mason ................... | 210/716 |
| 6,068,012 A | | 5/2000 | Beardwood et al. ...... | 137/3 |
| 6,304,327 B1 | | 10/2001 | Campbell et al. ........ | 356/437 |
| 6,306,281 B1 | | 10/2001 | Kelley ................... | 205/556 |
| 6,468,479 B1 | | 10/2002 | Mason et al. ........... | 422/187 |
| 6,645,457 B2 | * | 11/2003 | Mason et al. ........... | 423/477 |
| 6,949,196 B2 | * | 9/2005 | Schmitz et al. ......... | 210/739 |

FOREIGN PATENT DOCUMENTS

| | | |
|---|---|---|
| EP | 0698000 | 6/1998 |
| WO | WO 02/072484 | 9/2002 |

* cited by examiner

*Primary Examiner*—Peter A. Hruskoci
(74) *Attorney, Agent, or Firm*—David L. Hedden

(57) ABSTRACT

This invention relates to an automated process for efficiently treating an aqueous system with chlorine dioxide. The process results in high efficiency yields of chlorine dioxide on a continuous basis by minimizing the waste of precursor chemicals. Additionally, the process creates less environmental stress because the formation of unwanted by-products is minimized. The level of chlorine dioxide in the aqueous system treated and other parameters of the process are monitored and adjusted automatically to maintain them within acceptable levels.

10 Claims, 2 Drawing Sheets

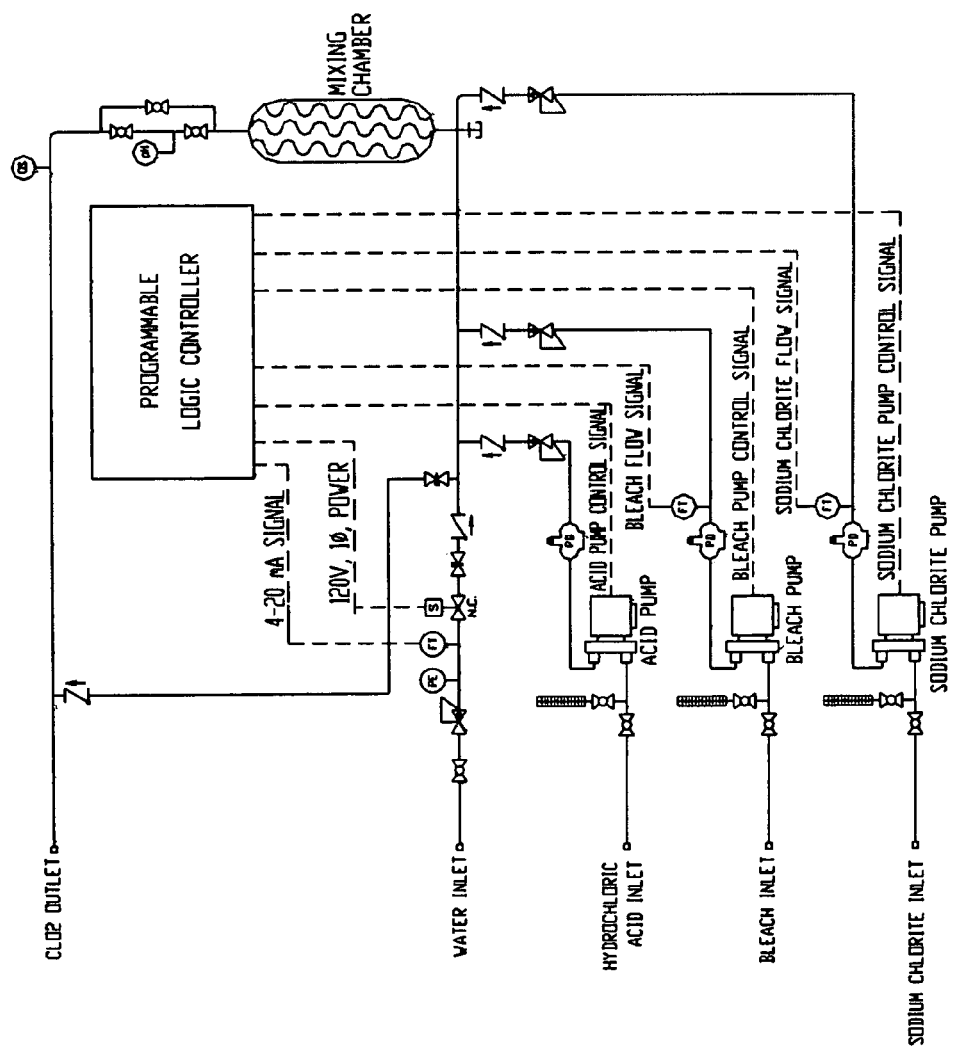

PROCESS FOR TREATING AN AQUEOUS SYSTEM WITH CHLORINE DIOXIDE

CROSS REFERENCE TO RELATED APPLICATIONS AND CLAIM TO PRIORITY

This application is a continuation-in-part application of provisional application Ser. No. 60/626,234 filed on Nov. 8, 2004, the contents of which are hereby incorporated into this application. This application claims the benefit of provisional application Ser. No. 60/626,234 filed on Nov. 8, 2004.

TECHNICAL FIELD OF THE INVENTION

This invention relates to a process for efficiently treating an aqueous system with chlorine dioxide. The process results in high efficiency yields of chlorine dioxide on a continuous basis by minimizing the waste of precursor chemicals. Additionally, the process creates less environmental stress because the formation of unwanted by-products is minimized. The level of chlorine dioxide in the aqueous system treated and other parameters of the process are monitored and adjusted automatically to maintain them within acceptable levels.

BACKGROUND OF THE INVENTION

Unless treated, aqueous systems are prone to undergo biological contamination. One of the most successful methods of preventing such contamination is by treating the aqueous system with an aqueous solution of chlorine dioxide.

Chlorine dioxide is typically generated on a continuous basis at the application site utilizing motive/dilution water and precursor co-reactant chemicals. The efficient generation of chlorine dioxide is obviously of economic and environmental significance. Generation efficiency is defined as the percentage conversion of precursor chemicals to chlorine dioxide. Poor generation efficiency results in lost profits and unconsumed precursor chemicals can lead to the generation of other by-products that potentially adversely affect the environment.

Generation efficiency is adversely affected for many reasons. It can be caused by the degradation of the sodium hypochlorite strength, which is a normal occurrence over time, or can result from the exposure of the sodium hypochlorite to heat and/or sunlight. Another cause for generation inefficiency is that the sodium hypochlorite may react with chemicals in the motive/dilution water, which results in the deactivation of the sodium hypochlorite. Variations in the motive/dilution water alkalinity also adversely affect the precursor chemical requirement, namely the amount of acid, which is required for pH control to achieve efficient chlorine dioxide generation.

Poor generation efficiency not only is uneconomical, but the by-products that result, when chlorine dioxide generation is not efficient, could potentially adversely affect human health and the environment. Whether the treated water is used as drinking water, or used for once-through or re-circulating cooling systems, there can be associated environmental issues. For example, the acceptable amount of chlorine dioxide in drinking water is typically limited to 0.8 mg/l; the amount of chlorite, (a precursor chemical) is typically limited to, for example, 0.8 mg/l; and the sum total of chlorite, chlorate, and chlorine dioxide (Total Residual Oxidant) is typically limited to, for example, 1 mg/l.

Additionally, if excess chlorine is used with chlorite in the generation of chlorine dioxide, then chloramines can be formed as a by-product. Excess chlorine may also result in the production of other unwanted by-products, such as trihalomethanes, halo acetic acids and halogenated organics in general.

Unwanted by-products, e.g. oxidants such as bromine, chlorine, monochloramines, monobromamines, hypochlorite, hypochlorous acid, chlorite, hypobromite, hypbromous acid, chlorine dioxide, chlorite, chlorate, and 1-bromo, 3-chloro-5,5-dimethlyhdrantoin can be hazardous when discharged into the environment in excessive quantities. Table I provides typical lethal doses of various oxidants for dalphina and rainbow trout.

TABLE I

Aquatic Lethality of Various Oxidants
(Typical Oxidant Lethal Concentration, LC 50, mg/l)

|  | Daphnia 48 hour | Rainbow Trout 96 hour |
|---|---|---|
| Bromine | 0.31 | 1.07 |
| Chlorine | 0.02 | 0.13 |
| Hypochlorite as NaOCl | 0.06 | 1.0 |
| Hypochlorous Acid as $Cl_2$ | 0.027 | 0.045 |
| Hypobromous Acid as $Br_2$ | 0.71 | 0.23 |
| Chlorine Dioxide as $ClO_2$ | 0.29 | 290 |
| Chlorite as $ClO_2-$ | 0.16 | 41 |
| Chlorate as $ClO_3-$ | 3162 | 4200 |
| 1-Bromo-3-chloro-5,5-dimethylhydantoin | 0.48 | 0.87 |

In view of the data reported in Table I, if chlorine dioxide generation is inefficient, it will be necessary to detoxify the chlorine dioxide prior to its discharge into an environmental receiving stream, and then detoxify these unwanted oxidants from the chlorine dioxide treated waters.

Disposing of treated water, e.g. process water and drinking water, also is a problem if the generation of chlorine dioxide is inefficient. Inefficient generation results in higher concentrations of sodium and chloride ions in the treated water, which is often used to irrigate agricultural land. If the treated water contains high concentrations of sodium ions, chloride ions, and other ions, this adversely affects the ability of the soil to absorb and retain water. This may limit the number of gallons of treated waters that can be used to irrigate agricultural land each year, which reduces the amount of treated water that can be disposed of through irrigation.

It is known that the production of chlorine dioxide can be maximized and the formation of unwanted by-products can be minimized by generating chlorine dioxide electrolytically under vacuum, using a complex series of electrolytic cells separated by a semi permeable gas transfer membrane. See, for instance, WO 94/26670. When this method is used, the chlorine gas generated in the electrolytic cell to passes into the treatment stream, but the amount of hypochlorous acid and hypochlorite ion resulting from hydrolysis in the treatment stream is reduced. Unfortunately, overtime the efficiency of chlorine dioxide generation drifts away from the initial set-up value due to variability in motive water flow, motive water chemistry and/or variability in precursor active strength or concentration.

All citations referred to under this description of the "Related Art" and in the "Detailed Description of the Invention" are expressly incorporated by reference.

BRIEF SUMMARY OF THE INVENTION

This invention relates to a process for treating an aqueous system with an aqueous solution of chlorine dioxide, generated by a chlorine dioxide generator, comprising:
  (a) calculating (1) the amount of precursor chemicals needed to obtain a pre-selected concentration of chlorine dioxide in the motive water effluent from the reaction chamber of the chlorine dioxide generator, and (2) calculating a pre-selected generation efficiency of chlorine dioxide;
  (b) monitoring (1) the pH of the aqueous solution exiting a reaction chamber of a chlorine dioxide generator, (2) the amounts of precursor chemicals needed to generate the pre-selected concentration of chlorine dioxide generated, (3) the concentration of chlorine dioxide in the aqueous solution generated, and (4) the generation efficiency of chlorine dioxide, and
  (c) adjusting the amounts of precursor chemicals to maintain (1) a pH of 2.0 to 3.0 for the aqueous solution exiting the reaction chamber of the generator, (2) the pre-selected concentration of chlorine dioxide in the motive water effluent from the reaction chamber of the chlorine dioxide generator; and (3) the pre-selected generation efficiency of chlorine dioxide;
  (d) feeding chlorine dioxide into the aqueous system to be treated at a rate to maintain a pre-selected concentration of chlorine dioxide in the aqueous system to be treated.

Preferably, the process is controlled by a PLC, wherein the PLC carries out the required functions continuously and automatically.

The process results in high efficiency yields of chlorine dioxide on a continuous basis by minimizing the waste of precursor chemicals. Additionally, the process creates less environmental stress because the formation of unwanted by-products is minimized. The level of chlorine dioxide in the aqueous system treated and other parameters of the process are monitored and adjusted automatically to maintain them within acceptable levels. Under treatment and over treatment of the aqueous system to be treated is avoided.

The process can be used to treat a variety of aqueous systems, including cooling water, drinking water, flume waters, water used in the processing of meat, poultry, fruits, vegetables, and beverages, and water used in the manufacture of paper products. Motive waters used for the generation of chlorine dioxide, which contain ammonia, amines, hydrogen sulfide, mercaptans and other chlorine reacting compounds, will also realize benefits form this invention.

When compared to the electrolytic/membrane process, the subject process provides the following advantages:
  (a) less complexity,
  (b) reduced power requirements,
  (c) lower maintenance costs,
  (d) lower capital costs and total operating costs,
  (e) higher operational power efficiency, and
  (f) less environmental impact.

BRIEF DESCRIPTION OF THE SEVERAL VIEWS OF THE DRAWINGS

FIG. 2 is a flow chart describing an automatic method used to bring together the reaction chemicals needed to generate an aqueous solution of chlorine dioxide and control the concentration of chlorine dioxide generated.

DETAILED DESCRIPTION OF THE INVENTION

DETAILED DESCRIPTION OF THE FIGURES

Figure 1:
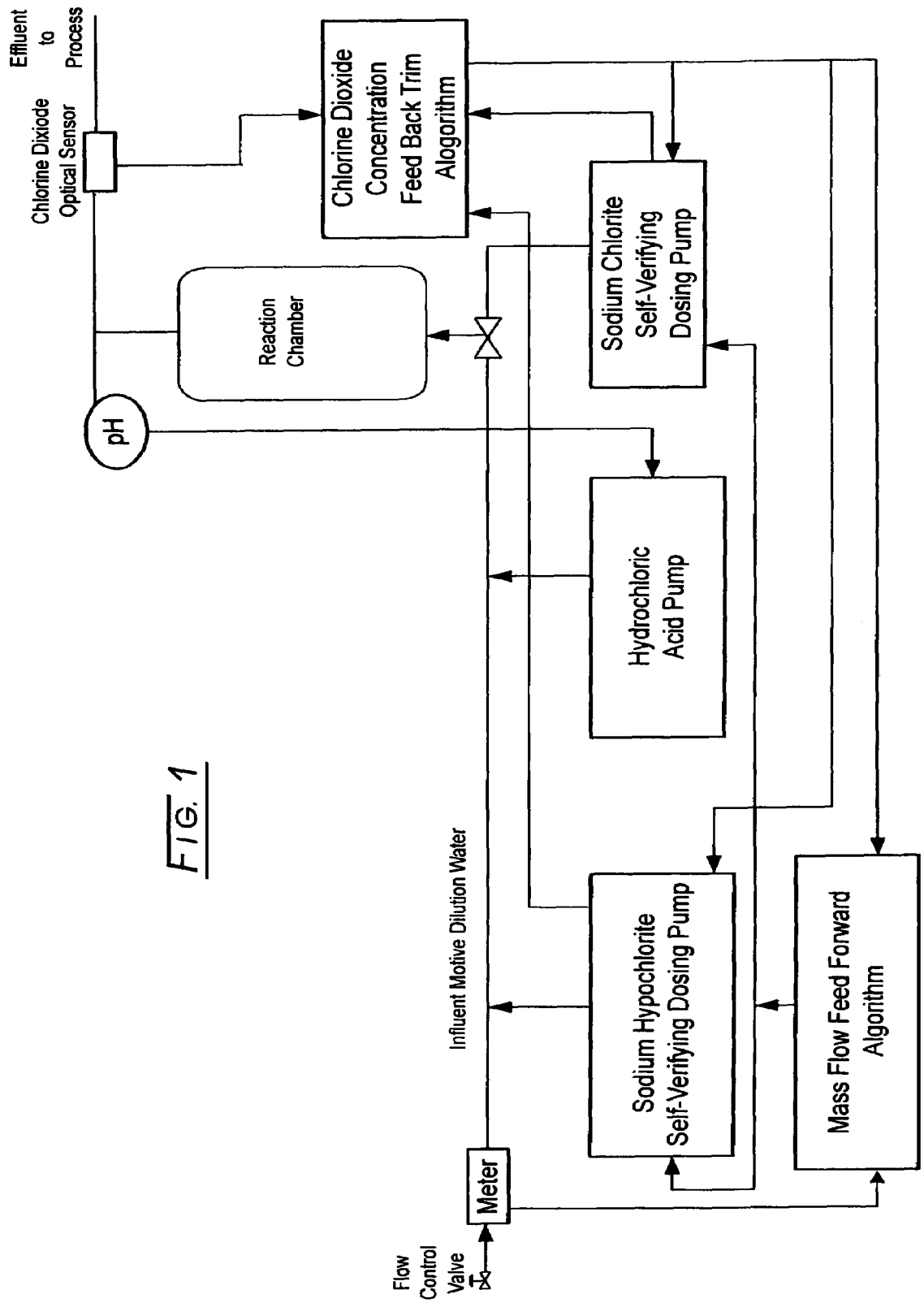
FIG. 1 is a flow chart describes a method for bringing together the reaction chemicals needed to generate an aqueous solution of chlorine dioxide and control the concentration of chlorine dioxide generated.

FIG. 1 is a flow chart describing one method used to generate an aqueous solution of chlorine dioxide. FIG. 1 illustrates the pumping of motive water, sodium hypochlorite, sodium chlorite, and hydrochloric acid the reaction chamber of a chlorine dioxide generator where they are reacted under controlled pH to generate an aqueous solution of chlorine dioxide. A Mass Flow Feed Forward Algorithm determines the amounts of reactants metered and pumped into reaction chamber and a Feed Back Trim Algorithm determines the concentration of chlorine dioxide in the aqueous solution of chlorine dioxide generated. The Feed Forward Algorithm also adjusts the dosing rates of the individual components chemicals to achieve the pre-selected generation efficiency of chlorine dioxide.

FIG. 2 is a more detailed flow chart describing the process of FIG. 1, but which is controlled automatically using a Programmable Logic Controller. The Programmable Logic Controller contains feed forward circuitry and feed backward circuitry, which carry out the Mass Flow Feed Forward Algorithm and Feed Back Trim Algorithm.

The detailed description and examples will illustrate specific embodiments of the invention will enable one skilled in the art to practice the invention, including the best mode. It is contemplated that many equivalent embodiments of the invention will be operable besides these specifically disclosed.

In order to most effectively carry out the process, the flow rate of the aqueous system to be treated is determined; a concentration of chlorine dioxide for said aqueous solution of chlorine dioxide to be generated is pre-selected; the amount of precursor chemicals needed to achieve the pre-selected concentration of chlorine dioxide is calculated; a range for the generation efficiency of chlorine dioxide to be obtained by generating an aqueous solution of chlorine dioxide is pre-selected.

The process is preferably carried out in a manner such that the calculated amounts of precursor chemicals are fed into the mixing or reaction chamber of said chlorine dioxide generator and are reacted under acidic conditions. One or more parameters of the treatment process are monitored such as the pH of the aqueous solution existing the reaction chamber, the amounts of precursors fed into the reaction chamber, the concentration of chlorine dioxide in the aqueous solution generated, and the generation efficiency of chlorine dioxide.

The parameters are adjusted so that the pH of the aqueous solution exiting the reaction chamber of said chlorine dioxide generator is maintained in a range from 2.0 to 3.0, the amounts of precursors fed into the reaction chamber are such that the concentration of chlorine dioxide in the aqueous solution produced is below the solubility limit of chlorine dioxide in water; and/or the generation efficiency of chlorine dioxide is within the selected range.

Preferably, the mole ratio of sodium chlorite to sodium hypochlorite is from about 2.0 to about 1.0, and the mole ratio of sodium chlorite to hydrochloric acid in the reaction chamber is from about 1.0 to about 2.0. Preferably, the concentration of chlorine dioxide in the aqueous solution exiting the reaction chamber is from 100 mg/l to 2,900 mg/l at 20° C. and 30 mm partial pressure.

Although the chlorine dioxide can be generated by any of the methods known in the art, preferably it is generated with sodium chlorite by reacting it with gaseous chlorine or acidified sodium hypochlorite as follows:

(1) Gaseous chlorine generation $$2NaClO_2 + Cl_2 \rightarrow 2ClO_2 + 2NaCl$$

(2) Acidified sodium hypochlorite generation $$2NaClO_2 + NaOCl + 2HCl \rightarrow 2ClO_2 + 3NaCl + H_2O$$

Specific practices for generating chlorine dioxide according to these methods are well know in the art. Examples of generation equipment suitable for use in the process are described in U.S. Pat. Nos. 4,013,761 and 4,147,115. Various means may be used to control the delivery of sodium chlorite and other chemicals to the generator. Such means include, but are not limited to, variable rate pumps, valves, eductors and metering devices. The precursor chemicals are typically pumped or educted into motive or dilution water. Then they are mixed in a mixing chamber or sent directly to the reaction chamber of the chlorine dioxide generator. Mixing the precursor chemicals first provides better yields of chlorine dioxide.

Although the pre-selected generation efficiency (E, as a percentage) can be arbitrarily selected, e.g. 70 percent or 80 percent, preferably the E sought will exceed 90 percent. The E is calculated as follows:

$$E = \frac{\text{Actual ClO}_2 \text{ generated}}{\text{Theoretical ClO}_2} \times 100 \qquad \text{EQ 3}$$

where the actual $ClO_2$ (chlorine dioxide) generated is the manipulation of the concentration detected in the generator effluent as measured by the optic sensor/spectrophotometer arrangement.

The theoretical $ClO_2$ (chlorine dioxide) generation capability assumes 100% conversion or generation efficiency of the sodium chlorite ($NaClO_2$) fed to the generator (i.e. 1 mole of sodium chlorite produces 1 mole of chlorine dioxide). This value is a manipulation of the sodium chlorite pump drawdown (ml/mm). The manipulations are as follows:

(a) $ClO_2$ Actual: \qquad EQ 4

$$\text{lbs. } ClO_2/\text{min} = \frac{x \text{ ppm } ClO_2 \times \text{usgpm flow of motive water}}{120{,}000 \text{ usgal}/10^6 \text{lbs. of motive water}}$$

(b) $ClO_2$ Theoretical: \qquad EQ 5

$$\frac{\text{MW NaClO}_2}{\text{MW} \times \text{ClO}_2} = \frac{90.5}{67.5} = 1.3407$$

$y$ lbs/min $ClO_2$ @ 100% Efficiency =

$$\frac{y \text{ ml/min NaClO}_2 \times \text{specific gravity(sg)}}{(\% \text{ Activity} \times 1.3407 \text{ lbs. NaClO}_2/\text{lbs. ClO}_2)}$$

(c) Percent Generation Efficiency is now simplified to % $E =$ \qquad EQ 6

$$\left[\frac{x \text{ ppm } ClO_2 \times \text{usgpm}}{(y \text{ ml/min NaClO}_2 \times sg) \div (\% \ AI \times 1.3407)}\right] \times 100$$

where AI is active ingredient.

wherein an an instrument, e.g. optic sensor/spectrophotometer, provides the x ppm $ClO_2$ value, a water flow measuring device on the motive dilution water provides the usgpm value, and a self verifying metering pump on the stable sodium chlorite solution provides the y m/min draw down value.

It can be seen from equation (2) that, if the NaOCl (sodium hypochlorite) feed is low there will be excess $NaClO_2$ (sodium chlorite) in the product stream. Similarly if $NaClO_2$ is fed in excess there will be sodium chlorate ($NaClO_3$) and excess sodium hypochlorite (NaOCl) in the product stream depending upon the conversion efficiency. The latter is given as follows:

$$3NaClO_2 + 2NaOCl + 2HCl \rightarrow 2ClO_2 + NaClO_3 + 4NaCl + 2H_2O$$

In either case the generation efficiency of chlorine dioxide generation is reduced because of unwanted by-products. Therefore, it is important to maintain the proper mole ratio of reactants during the generation process.

Steady state operations utilize the feed forward control feed of sodium chlorite and sodium hypochlorite based upon metered flow of the motive dilution water. Self-verifying pumps are set-up to provide the dosing rates required to produce the chlorine dioxide concentration desired as per the example calculations.

Typically, hydrochloric acid is used to maintain the pH at the optimum level for the chemical reaction to occur. The pH is preferably measured at the reaction chamber outlet with a sensing probe, e.g. pH meter, set to provide ratio adjustment feed of the hydrochloric acid pump between a pH of 2.7 and 2.9 or 2.7 and 2.8. Feedback control may provide either analog or digital outputs to operating equipment such as pumps and valves. Analog outputs may go through Proportional Integral Derivative (PID) controllers for more precise control. When the reaction pH is optimized and the stable precursor, sodium chlorite is base loaded, the variability in the motive water chemistry (i.e. containing chlorine/hypochlorite reactants) and the hypochlorite activity (i.e. the concentration degrades with time naturally and it is temperature and sunlight dependent) variability need to be addressed to avoid under or overfeed of the chlorine precursor.

Preferably, the process uses dosage self-verifying pumps to feed the precursor chemicals to the reaction chamber of the $ClO_2$ generator; an optical sensor and spectrophotometer to measure the concentration of generated chlorine dioxide; a reaction pH control; controls with defined algorithms that provide for feed-forward precursor addition to maintain the appropriate concentration of chlorine dioxide in the aqueous solution of chlorine dioxide generated and a closed loop feedback trim that calculates chlorine dioxide generation efficiency and adjusts the chlorine precursor chemical addition rate to maintain the pre-selected generation efficiency. An ORP controller is also incorporated to measure and the maintain desired chlorine dioxide concentration in the aqueous system treated.

The amounts of chemicals fed into the reaction chamber of the chlorine dioxide generator, and the key parameters of the process, are monitored by analog or digital sensors in the lines feeding the chemicals to the reaction chamber, the reaction chamber, or the lines exiting the reaction chamber. Signals from the sensors provide input that is fed to a Master Control Unit. The Master Control Unit is a PLC (programmable logic controller)-based system comprising control logic and an operator interface. Any PLC and operator interface-based system can be used. The Master Control Unit regulates all aspects of the process, insuring that chlorine dioxide is generated in a safe and efficient manner.

The Master Control Unit uses the information to regulate the flow of precursor chemicals according to the defined algorithm carried out by the Master Control Unit, so that the parameters of the process are maintained and chlorine dioxide is efficiently generated.

All key parameters of the process and the mole ratios of the reactants are kept within the appropriate ranges and adjusted in real time on a continuous basis. An algorithm carried out by a control unit having a closed loop feedback circuit defines their relationships. The information derived from monitoring the parameters of the process is used to determine the generation efficiency and to adjust amount of the precursor chemicals used for generation of the $ClO_2$ on a real time basis, (i.e. instantaneously) to provide the preset efficiency desired. The Master Control Unit uses a primary feed-forward mass flow algorithmic feed of the sodium hypochlorite and sodium chlorite. A secondary coupled algorithm associated with a closed loop feedback trim is also employed to maximize the efficiency of the generation process, while minimizing the formation of chlorite, hypochlorite, chlorate, and other by-products during the generation of chlorine dioxide.

Optical sensors can measure the concentration of $ClO_2$ in the aqueous solution of $ClO_2$ produced by the chlorine dioxide generator. Such sensors are available from Custom Sample Sensors, Inc., St. Louis, Mo. Examples of such sensors are described in U.S. Pat. Nos. 5,241,368; 5,408,313; and 4,637,730.

The chlorine dioxide generated by the process can be used to treat an aqueous system according to an automated process. In order to do so, one must first pre-select how much chlorine dioxide must be fed in the aqueous stream to be treated. For a cooling water system this is typically done by estimating the total chlorine dioxide demand (TCD) needed for the system to be treated.

$$TCD = \text{System Water Demand } (SWD) + \text{System Network Demand } (SND) + \text{Residual Chlorine Dioxide } (RCD) \qquad \text{EQ 7}$$

System Water Demand, (SWD) can be determined a number of ways, but is typically determined by tritrating chlorine dioxide into a sample of the system water to be treated until the detection of a free unreacted residual of chlorine dioxide is achieved.

Residual Chlorine Dioxide (RCD), is the amount of free or unreacted chlorine dioxide concentration that is to be maintained in the aqueous system being treated. The preferred residual concentration dependents upon the type of aqueous system being treated and the contaminants found in it, e.g. foulants, sludges, biofilms, and general debris. SND is determined empirically by feeding chlorine dioxide to the aqueous system to be treated at the SWD rate plus RCD rate ( i.e. x ppm). Then the feed rate (ppm) of chlorine dioxide is increased continuously until the targeted residual is reached in the return water.

As an example, in order to disinfect a typical aqueous system, the RCD must be maintained in the range of 0.1 to 0.25 mg/l. Assuming a 0.25 mg/l residual will be maintained and the water chlorine demand is 0.75 mg/l, then the TCD is calculated as follows:

$$TCD = 0.75 \text{ mg/l}(SWD) + 0.6 \times 0.25 \text{ mg/l}(SND) + 0.25 \text{ mg/l}(RCD)$$
$$= 1.15 \text{ mg/l or } 1.15 \text{ ppm for dilute solutions.}$$

In order to minimize over treatment and under treatment of the aqueous system, RCD is measured and monitored, e.g. by the DPD Method (American Water Works Standard Method 4500-C102D) or the Amperometric Method II (American Water Works Standard Method 4500-C102E), and the measurement of the ORP (oxidation reduction potentials) for the system to establish a baseline, or the use of ALDOS unit which is continuously in the treated system equivalent to the RCD required. Conversely, the chlorine dioxide concentration selection set point of the optic sensor control system/algorithm could be increased or decreased for fluctuations that indicate when an adjustment in the amount of chlorine dioxide level (TCD) is needed to maintain the appropriate RCD level. The RCD in the aqueous system is maintained by ORP or ALDOS unit[3] feedback to the control valve on the inlet to the generator. This increases or reduces the motive dilution water flow to the generator, which in turn, then delivers more or less volume of a fixed chlorine dioxide solution to the aqueous system that is being treated. This method can also be applied to an intermediate storage tank containing the prepared fixed concentration of chlorine dioxide solution from the generator, where-in the flow from this tank to a system or multiple systems are increased or decreased to maintain the ORP in the treated system equivalent to the RCD required.

Preferably, the process is controlled by a PLC, wherein the PLC carries out the following functions continuously and automatically:
(a) calculates the TCD value required to treat the aqueous system;
(b) determines the concentration of chlorine dioxide required in the motive water effluent from the reaction chamber required to achieve the TCD value;
(c) determines the amounts of precursor chemicals required to achieve the required concentration of chlorine dioxide to treat the aqueous system and the desired efficiency;
(e) monitors the concentration of chlorine dioxide in the motive water to determine whether it is decreasing, increasing, or remains constant;
(f) automatically adjusts the feed rate of chemicals to maintain the pre-selected percent efficiency programmed into the PLC by adjusting the parameters of the process as follows:
 (1) measuring the pH and maintaining it within the desired range;
 (2) measuring the chlorine dioxide concentration and comparing it to the set point and adjusting the feed of the precursor chemicals as follows:
  (i) if the chlorine dioxide generation efficiency is less than theoretical efficiency selected, then the sodium hypochlorite pumping rate is increased in a stepwise fashion;
  (ii) if the chlorine dioxide generation efficiency is higher than the theoretical efficiency selected, that the sodium chlorite pumping rate is reduced in a stepwise fashion;
  (iii) if the chlorine dioxide generation efficiency is in the desired range, then no further changes are made.

(g) repeating step (f).

The monitors generate analog or digital signals that are sent to the master control unit, having a closed-loop feedback trim, which feeds precursor chemicals to the reaction chamber of the $ClO_2$ generator, so that the performance parameters of the process are maintained.

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Example 1

(Continuous Feed of Chlorine Dioxide Generated by the Acidified Sodium Hypochlorite Method Applied to a Once-through Application)

This example illustrates how the process is used for the continuous feed of chlorine dioxide generated by the acidified sodium hypochlorite method in a once-through application. For instance, if the system to be treated were a once-through design flowing at the rate of at 10,000 U.S. gallons per minute, then the pounds per hour of chlorine dioxide required to be generated to produce 1.15 ppm ClO2 would be calculated as follows:

$$\frac{10,000 \text{ US gpm} \times 60 \text{ minutes/hr.} \times 8.34 \text{ lb./U.S. gal.}}{1,000,000} \times 1.15 \text{ ppm} = \quad \text{EQ 8}$$

$$5.75 \text{ lbs. } ClO_2 \text{ per hour}$$

In order to minimize over treatment and under treatment, the $ClO_2$ is added to the water system to be treated and $ClO_2$ level is measured utilizing either the DPD Method (Standard Method 4500-C102D) or the Amperometric Method II (Standard Method 4500-C102E). Additionally, the ORP (oxidation-reduction potential) is measured. Once a $ClO_2$ residual of 1.15 to 1.25 mg/l (ppm) is detected, the ORP is noted and the ORP controller set to these lower and upper control values. The ORP controller then modulates the motive/dilution water flow of the ($ClO_2$) generator to the system being treated for a continuous operation applied to a once through system.

The pH of the aqueous solution exiting the reaction chamber is set at 2.7 to 3.0 and is controlled by hydrochloric acid addition to the motive/dilution water utilizing a pH control system.

The amounts of sodium chlorite and sodium hypochlorite fed to achieve 100 to 2,000 mg/l of $ClO_2$ in the motive/dilution water flow is selected For example if the chlorine dioxide concentration to be generated is 2,000 mg/l (i.e. 20 lbs. $ClO_2$ in 1200 usgal), and the system to be treated requires 5.75 lbs./hr of chlorine dioxide, then the generator dilution motive water flow is adjusted to 5.76 usgpm. The precursor chemical pump base line feed rates are then set to feed as 100% active precursor:

Sodium Chlorite—0.128 lbs./min

Sodium Hypochlorite—0.053 lbs./min

Hydrochloric Acid—0.052 lbs./min

This then at 100% efficiency produces 2,000 mg/l chlorine dioxide solution leaving the generator at a flow of 5.76 usgpm and overall bulk chlorine dioxide generation at 5.75 lbs./hr.

If the generation efficiency is below 90%, and the $ClO_2$ detected by the optic sensor/spectrophotometer is below 1800 mg/l (i.e. 2,000 mg/l $ClO_2$ chosen at 90% conversion efficiency provides 2,000×0.9=1800 mg/l $ClO_2$) (i.e. original generation rate to be set based on feed forward mass flow chemical additions), the verified amount of sodium chlorite fed is then compared to the calculated amount of sodium hypochlorite required to achieve 90% plus efficiency. If the verified amount of sodium hypochlorite fed is below the calculated amount, the feed is increased to the theoretical or calculated amount. If the efficiency set point is not met, then either degradation of the sodium hypochlorite strength has occurred (this normal occurrence overtime and/or exposure to heat and/or sunlight) or the sodium hypochlorite is reacting with species in the motive/dilution water and causing deactivation. The latter should not be present as the motive/dilution water should be clean and pretreated to assure no suspended solids, transition metals, nitrite or organic matter is present in appreciable amounts. The former is handled by incrementally increasing the verified sodium hypochlorite dosing rates by a percentage factor say 5%, every 25 to 50 reaction chamber volume displacements (i.e. 1 displacement is the reaction chamber volume in gallons divided by the motive/dilution water flow in gallons per minute) until the chlorine dioxide generation efficiency set point is met. Similarly, if the motive dilution water flow varies, then the chlorine dioxide concentration detected by the optic sensor/spectrophotometer will also vary. The verified amount of sodium chlorite fed is then compared to the calculated sodium hypochlorite required to achieve 90% plus efficiency. If the verified amount of sodium hypochlorite fed is below the calculated amount, the feed is increased to the theoretical or calculated amount.

If the generation efficiency is at or above the set point and the sodium hypochlorite verified feed is greater than required for the set point, then, the fed is incrementally reduced by a percentage factor, say 5% every 25 to 50 reaction chamber volume displacements until the desired $ClO_2$ generation efficiency is met.

The control system also contains automatic lockouts and alarms for a loss feed of any one of the chemicals utilized, namely sodium hypochlorite, sodium chlorite, and hydrochloric or sulfuric acid. The alarms and monitoring data can be automatically forwarded to any desired location such as a Distributed Control System or P.C. by various means (i.e. Local Area Network, telephone/cell phone modem, internet connections, etc.) and then reported to others by various means (i.e. pager, cell phone text messaging, e-mail or fax) for example the "Onguard On-line™" method practiced by Ashland Drew Industrial Division. The monitoring data, tracking, SPC manipulation, for example "Drewtrax™" method practiced by Ashland Drew Industrial Division, either locally or remotely and linked to various business systems or analytical and troubleshooting tools that allow for remote reporting or corrective actions/adjustments of the chlorine dioxide generation process, thus increasing the capability of field generation of chlorine dioxide efficiency and residual maintenance in the said system being treated with chlorine dioxide.

This process is only one illustrative example for the continuous feed of chlorine dioxide generated by the acidified sodium hypochlorite method applied to a once-through application. The process can also be used to produce chlorine dioxide by the gaseous chlorine method. Other applications include, for example, semi-continuous batch operations or recirculatory cooling water systems.

Example 2

(Determining Initial Feedrate of the Self Verifying Pumps for $ClO_2$ Application in a Recirculatory Cooling Water)

A biofilm-fouled recirculatory cooling tower water required both clean up of the biological surface films and overall disinfection. The system water had a demand of 2.1 mg/l of chlorine dioxide and a 0.25 mg/l residual was to be maintained. The $ClO_2$ dosing is calculated as follows:

mg/l $ClO_2$(TCD)=2.1 mg/l (SWD)+0.25 mg/l (RCD)+(0.25 mg/l×0.6) (SND)=2.5 mg/l

In dilute solutions this is equivalent to 2.5 ppm $ClO_2$ for maintenance disinfection. In order to facilitate biofilm clean-up the ($ClO_2$) was fed at 4 times the maintenance dosage for 7 days. That is 10 ppm $ClO_2$ was fed.

In order to determine the initial settings on the precursor chemical pumps, the chlorine dioxide dosing rate of 10 ppm had to be converted into the required chlorine dioxide generation rate in pounds per hour (lbs./hr). This was done on the basis of system data, mass balance and following equation:

$$\text{lbs./hr. } ClO_2 = \frac{(\text{Volume} + \text{Make-up/day}) \times 8.3 \times \text{ppm } ClO_2}{\text{hours of } ClO_2 \text{fed/day} \times 1,000,000} \quad \text{EQ 9}$$

where the cooling water data and mass balance provided:
Volume=750,000 U.S. gallons
Make-up/day=394,560 U.S. gallons
Hours of operation was continuous, or 24 hrs/day
Therefore, the $ClO_2$ generation rate required would be 3.9 lbs./hr using equation (9). The combining rates for the precursor chemicals used in equation (2) corrected for percentage active and specific gravity are given as follows:
Sodium Hypochlorite, U.S. gallons/hr.=lb./hr. $ClO_2 \times 0.43$ (5)
Sodium Chlorite, U.S. gallons/hr.=lbs./hr $ClO_2 \times 0.511$ (6)
Hydrochloric Acid, U.S. gallons/hr.=lbs./hr $ClO_2 \times 0.18$ (7)
This then resulted in an initial setting of the pumping rates of the precursor chemicals as follows:
Sodium Hypochlorite=1.677 U.S. gal/hr. (106 ml/min.)
Sodium Chlorite=1.993 U.S. gal./hr. (126 ml/min.)
Hydrochloric Acid=0.702 U.S. gal./hr. (44 ml/min.)
"Apparent" Under Feed of Sodium Hypochlorite Precursor During the initial biofilm clean-up process, the efficiency of chlorine dioxide generation was calculated to be 54 percent. After flow through the generator and adjustments, precursor dosing rates and pH (i.e. 2.9-3.0) were found to be acceptable and further investigation was performed. It was found that the motive/dilution water flowing into the generation equipment contained an average of 21.2 ppm ammonia (i.e. average of 12 tests). It is well known that ammonia is added to water that is to be chlorinated in order to reduce the formation of trihalomethanes (THM's) and haloacetic acids (HAA's), i.e. cancer and health issues, reduce the corrosivity of chlorine towards the storage and distribution system and provide disinfectant persistence throughout the filtration, storage, and distribution system of said potable water.

The combining ratio typically used to form monochloramine is more than two moles of ammonia (i.e. excess) per mole of chlorine injected. The parts per million of ammonia was compared to the calculated parts per million of sodium hypochlorite as chlorine injected into the dilution/motive water. The actual combining ratio present was calculated to be 4.03:1 (i.e. $NH_3:Cl_2$). The sodium hypochlorite feed was increased from 5.52 ppm feed to 12 ppm or increased by a factor of 2.17. This lowered the $NH_3:Cl_2$ combining ratio to 1.83:1 and the chlorine dioxide efficiency increased to 93%, while chloramines was detected in the finished product water by amperometric titration.

Thus, this example is one where sodium hypochlorite is present in retrograde strength or concentration. The example also illustrates novel way to automatically provide mixed disinfectants to potable water, which is of lower corrosivity and free of forming THM's and HAA's, as well as providing persistency throughout the storage and distribution of the treated aqueous system.

Under Treatment Dosing of Sodium Hypochlorite

After the biofilm clean-up process was complete, the chlorine dioxide was reduced to 2.5 ppm or a generation rate of 0.97 lbs./hr. This required a reduction of the precursor chemical dosing rates. Over the course of the trial, the chlorine dioxide generation efficiency slowly decreased to 65 to 67%. The background cooling water blowdown chlorite residual had risen from 0.1 to 0.2 ppm to 0.9 ppm and higher over this time period. The motive/dilution water ammonia had averaged 0.39 ppm (17 tests) indicating a theoretical $NH_3:Cl_2$ combining ratio of 1:3.4.

The sodium hypochlorite and sodium chlorite dosing rates were re-measured and the low efficiency verified under dosing of the sodium hypochlorite while the pH had ranged from 2.6 to 3.0. The theoretical combing ratio of $NH_3:Cl_2$ was calculated to be 1:2.2. An increase in the sodium hypochlorite dosing rate from 0.31 U.S. gal./hr. (19-20 ml/min) to 0.42 U.S. gal./hr. (26-27 ml/min) resulted in re-attaining a chlorine dioxide generation efficiency of 95%.

Example 3

(Cooling Water Used for Fertigation)

It is not difficult to envision that if only 60% chlorine dioxide generation efficiencies are obtained, then, in the case of 2.5 ppm chlorine dioxide fed, there will be 1.0 ppm chlorite in the discharge water compared to 0.125 ppm chlorite at 95% efficiency. This forty percent loss in efficiency could reduce the volumes of waters to be discharged onto fertile land by up to 30%. Therefore, maximizing chlorine dioxide efficiency and minimizing excess reactants and reactant by-products can have a significant positive impact on the allowable disposal volumes of treated water through the fertigation process.

I claim:

1. An automated process for treating a contaminated aqueous system with an aqueous solution of chlorine dioxide generated by a chlorine dioxide generator having a reaction chamber, wherein contaminated water enters the chlorine dioxide generator and is motive dilution water for precursor chemicals that are reacted in the reaction chamber of said chlorine dioxide generator, such that said motive water exits the chlorine dioxide generator as an aqueous solution of chlorine dioxide, which is fed into the contaminated aqueous system to be treated, wherein said process comprises:

(a) pre-selecting:
  (1) a concentration of chlorine dioxide for the aqueous solution of chlorine dioxide exiting from the reaction chamber of the chlorine dioxide generator, and
  (2) a generation efficiency for the chlorine dioxide generator;
(b) monitoring:
  (1) a total system water demand of the contaminated motive dilution water entering the chlorine dioxide generator;
  (2) the pH of the aqueous solution of chlorine dioxide exiting the reaction chamber of the chlorine dioxide generator,
  (3) the amounts of precursor chemicals,
  (4) the concentration of chlorine dioxide in the aqueous solution exiting from the reaction chamber of the chlorine dioxide generator, and
  (5) the generation efficiency of chlorine dioxide generator;
(c) calculating:
  (1) the total chlorine dioxide demand needed for the contaminated motive dilution water entering the chlorine dioxide generator in order to obtain the pre-selected concentration of chlorine dioxide in the aqueous solution of chlorine dioxide exiting the reaction chamber, and
  (2) the amount of precursor chemicals needed to treat the contaminated motive dilution water entering the reaction chamber of the chlorine dioxide generator in order to obtain said pre-selected concentration of chlorine dioxide in the aqueous solution of chlorine dioxide exiting the reaction chamber of the chlorine dioxide generator;
(d) adjusting the amounts of precursor chemicals to maintain:
  (1) a pH of 2.0 to 3.0 for the aqueous solution of chlorine dioxide exiting the reaction chamber of the generator,
  (2) the pre-selected concentration of chlorine dioxide in the aqueous solution of chlorine dioxide exiting the reaction chamber of the chlorine dioxide generator, and
  (3) the pre-selected generation efficiency of the chlorine dioxide generator;
(e) feeding the aqueous solution of chlorine dioxide exiting from the chlorine dioxide reaction chamber into said contaminated aqueous system, wherein the steps of said process are automatically carried out by a Programmable Logic Controller (PLC) containing a mass flow feed forward algorithm that automatically regulates the amounts of the precursor chemicals pumped into reaction chamber and a feed back algorithm that regulates the concentration of chlorine dioxide in the aqueous solution of chlorine dioxide generated.

2. The process of claim 1 wherein the precursor chemicals are sodium chlorite, sodium hypochlorite, and hydrochloric acid.

3. The process of claim 2 wherein the PLC continuously:
  (a) monitors the chlorine dioxide concentration in the aqueous solution of chlorine dioxide exiting the chlorine dioxide generator reaction chamber,
  (b) compares the chlorine dioxide concentration in the aqueous solution of chlorine dioxide exiting the chlorine dioxide generator reaction chamber to the pre-selected concentration for the chlorine dioxide in the aqueous solution of chlorine dioxide exiting the chlorine dioxide generator reaction chamber, and
  (c) adjusts the amounts of the precursor chemicals as follows:
    (1) if the chlorine dioxide generation efficiency is less than theoretical efficiency selected, then the sodium hypochlorite pumping rate is increased in a stepwise fashion;
    (2) if the chlorine dioxide generation efficiency is higher than the theoretical efficiency selected, then the sodium chlorite pumping rate is reduced in a stepwise fashion;
    (3) if the chlorine dioxide generation efficiency is in the desired range, then no further changes are made.

4. The process of claim 3 wherein the pre-selected concentration of chlorine dioxide in the aqueous solution generated, the generation efficiency of chlorine dioxide, and the concentration of chlorine dioxide in the aqueous system to be treated are ranges.

5. The process of claim 4 wherein the generation efficiency of the chlorine dioxide generator is at least 90 percent.

6. The process of claim 5 wherein an optical sensor is used to detect the concentration of chlorine dioxide in the aqueous solution of chlorine dioxide and the optical sensor sends a signal to the PLC, which reflects the concentration of chlorine dioxide in the aqueous system of chlorine dioxide exiting the reaction chamber of the chlorine dioxide generator.

7. The process of claim 6 further comprising determining the flow rate of the motive dilution water to be treated.

8. The process of claim 7 wherein the concentration of chlorine dioxide in the aqueous solution of chlorine dioxide exiting the reaction chamber is below the solubility limit of chlorine dioxide in water.

9. The process of claim 8 wherein the mole ratio of sodium chlorite to sodium hypochlorite is from about 2.0 to about 1.0, and the mole ratio of sodium chlorite to hydrochloric acid in the reaction chamber is from about 1.0 to about 2.0.

10. The process of claim 9 wherein the concentration of chlorine dioxide in the aqueous solution exiting the reaction chamber is from 100 mg/l to 2,900 mg/l at 20° C. and 30 mm partial pressure.

* * * * *